United States Patent [19]

Swanson et al.

[11] Patent Number: 4,757,184

[45] Date of Patent: Jul. 12, 1988

[54] RACK LOADED, RADIANT HEATED, CANTILEVERED DECK OVEN AND METHOD

[76] Inventors: David L. Swanson, 1670 Lake Largo, Green Bay, Wis. 54301; Gilbert Trick, 888 St. Charles Dr., Green Bay, Wis. 54302

[21] Appl. No.: 945,968

[22] Filed: Dec. 24, 1986

[51] Int. Cl.$^4$ .............................................. H05B 3/22
[52] U.S. Cl. .................................... 219/400; 219/386
[58] Field of Search ............... 219/400, 385, 386, 387, 219/401; 126/21 A, 21 R; 34/192, 195, 197

[56] References Cited

U.S. PATENT DOCUMENTS

| | | | |
|---|---|---|---|
| 288,201 | 11/1883 | Blodgett | 126/21 R |
| 3,674,982 | 7/1972 | Hoyt | 219/400 |
| 4,020,310 | 4/1977 | Souder | 219/386 |
| 4,215,266 | 7/1980 | Smith | 219/413 |

FOREIGN PATENT DOCUMENTS 2716352 11/1977 Fed. Rep. of Germany ...... 219/400

Primary Examiner—Joseph W. Hartary
Assistant Examiner—Teresa J. Walberg
Attorney, Agent, or Firm—Joseph M. Recka

[57] ABSTRACT

A hot deck baking oven, which is an insulated cabinet enclosing internally heated decks, mounted one above the other; the bottom of one deck and the top of an adjacent deck form a baking chamber; baking is accomplished by holding bread dough in a stable thermal gradient in the baking chamber; each of such decks is cantilever supported from the rear and is spaced away from the sidewalls of the cabinet; the vertical supports of a bread rack inserted into the oven are guided into the oven by the opening between the sidewalls and the decks; the bakery product on the rack is held within each baking chamber; the sidewall/deck separation, allows moisture generated at each baking chamber to pass up the sidewalls of the chamber, to be vented from the top of the oven through an exhaust vent, an intake vent located below the lowest baking chamber allows air to preheat before entering the baking chamber.

6 Claims, 6 Drawing Sheets

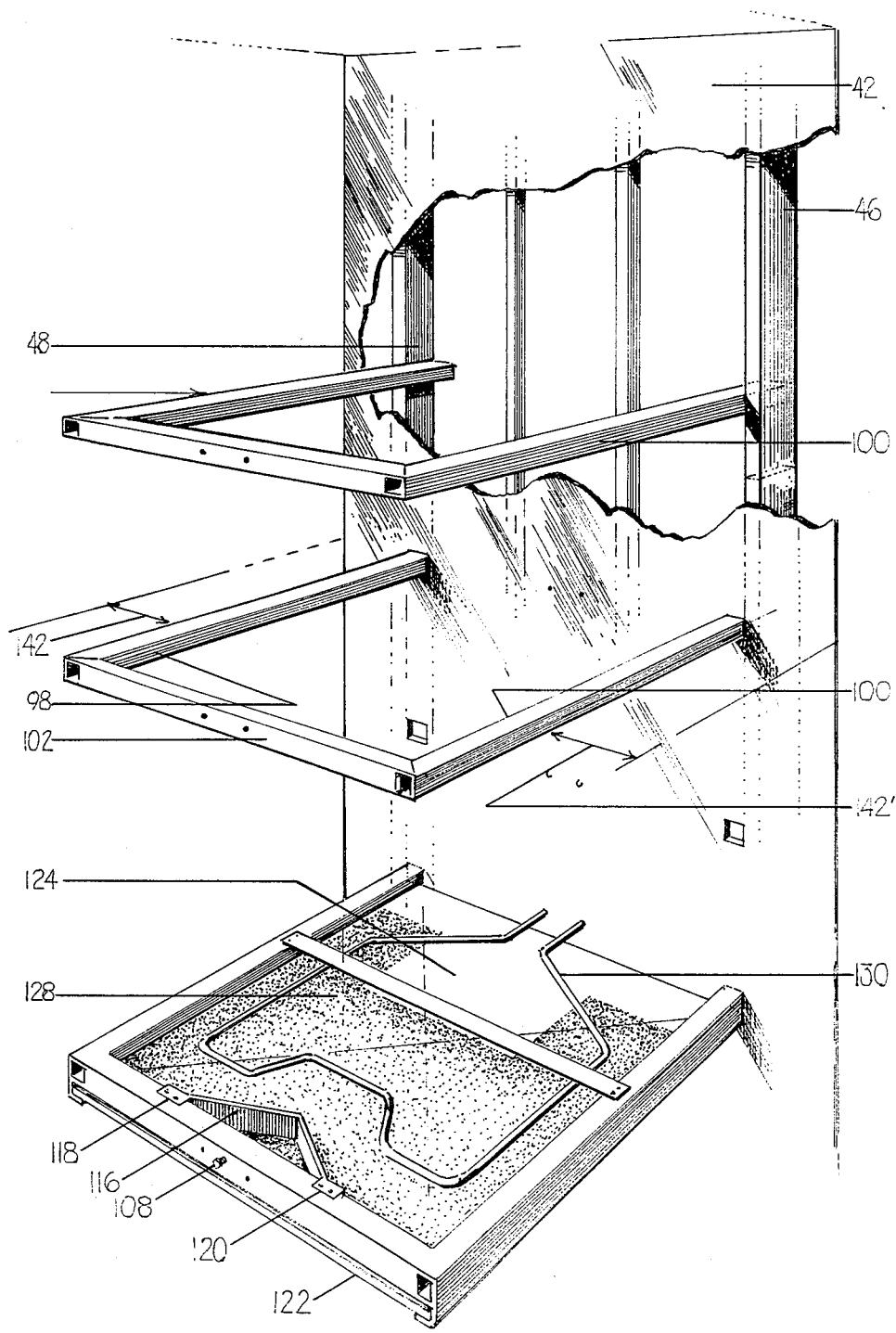

RACK LOADED, RADIANT HEATED, CANTILEVERED DECK OVEN AND METHOD

BACKGROUND OF THE INVENTION

1. Field of the Invention

A rack loaded, radiant heated, cantilevered deck baking oven to be used for baking or roasting.

2. Description of the Related Art

Radiant heated baking ovens are shown in U.S. Pat. No. 4,215,266 and U.S. Pat. No. 4,503,837. Shown in those patents are discrete deck radiant heated ovens.

Baking at point of purchase markets is performed by one of two technologies, (1) Convection baking, accomplished by passing large volumes of heated air across proofed dough, and (2) Radiant baking, accomplished by baking proofed dough in a stationary thermal gradient between two heated decks.

Baking by convection, is faster and requires less handling than does baking by radiant heating. A typical convection oven is large enough to accept a caster mounted rack on which pans of bread are mounted. The rack is placed in the oven, and the rack, with its pans of proofed dough, is rotated about a vertical axis in front of jets of heated air. The large volume of heated air required, removes moisture from the bread, shortening the bread's shelf life and storage life.

Baking by radiation, requires establishing a stable thermal gradient through the bread to be baked and then maintaining that thermal gradient until the bread is baked. The temperature at the top of the bread must be high enough to brown the bread. Baking temperature must be maintained through the body of the bread. Drying is not a problem with radiant baking. Adding moisture is not necessary. Shelf life of radiant baked bread is longer than shelf life of bread baked by convection.

A typical radiant baking oven comprises discrete heated decks, mounted one above the other, each deck having its own door or group of doors. The decks have back, sides, top and bottom. Access to the heated deck is through a single door or through group of doors.

Trays of proofed bread dough are placed on the heated deck. The trays remain in the oven, within an established thermal gradient until the bread is baked and browned. Baking in such an oven requires multiple handling of trays and opening and closing of oven doors.

This invention is a rack loading, radiant heated, deck oven with cantilevered baking decks. Open sided baking chambers are used to bake the bread. By leaving a space between the sides of the decks and the oven wall, the oven can be loaded by a rack loaded with pans of bread.

It is an object of the invention to provide a baking oven that can use racks for loading pans of bread for baking, using radiant baking technology.

It is an object of the invention to provide a baking oven that does not require rotation of the rack during baking.

It is an object of the invention to provide a rack loading oven of substantially smaller external dimensions than convection ovens.

It is an object of the invention to provide a radiant heated baking oven, that can be loaded with single baking pans and can bake product on a single hand loaded baking pan on a single deck, or back a rack of multiple pans per deck. This oven can be hand loaded or rack loaded.

It is an object of the invention to mount the heat sensors inside the heated decks, to eliminate breakage of the sensors.

It is an object of invention to locate a sensor within each deck to control the amount of heat provided by each deck.

It is an object of the invention to provide a radiant heated baking oven sensitive to internal air currents.

BRIEF DESCRIPTION OF THE DRAWINGS

Drawing 1 is a perspective view of the radiant deck oven with a section through the side and top of the oven.

Drawing 2 is a perspective disassembly view, showing structure of the cantilevered decks.

Figure 1:
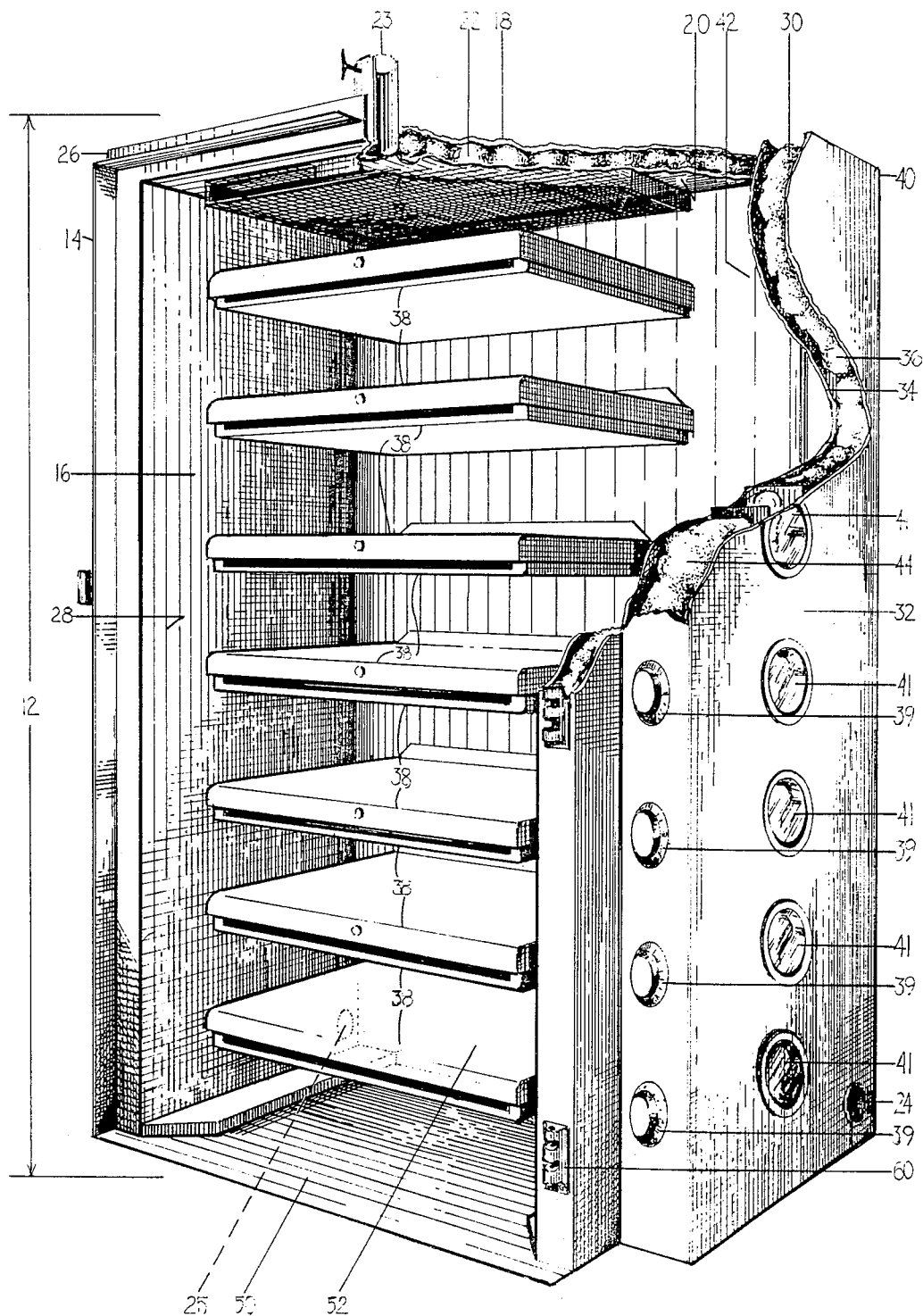

Drawing 3 is a section view taken through the left side of a foreshortened intermediate deck showing location of heat sensor, and construction of the deck.

Drawing 4 is a section view taken through the left side of a foreshortened intermediate deck showing the attachment of the deck to the back of the oven.

Drawing 5 is a front view of the deck with cover plate off, with a partial rotation on the drawing showing the upside down L shape of the front structural member, and showing location of the heat sensor.

Drawing 6 is a top view of a deck showing placement of heating element, placement of heat absorption pattern, placement of sensor shield and location of sensor.

Drawing 7 is a perspective view showing a rack inserted into the radiant heated oven.

Drawing 8 is a section view showing pitch of deck and complementary pitch of rack.

Drawing 9 is a partial view showing guidance system for rack.

Drawing 10 is an electrical schematic of the device.

DESCRIPTION OF THE PREFERRED EMBODIMENT

Description of Apparatus

The elements of the baking oven are:
Radiant Heated Deck Oven 12
Cabinet 14
Baking Chamber 16
Cabinet Top 18
Baking Chamber Top 20
Insulation in top of Oven 22
Moisture Vent Top 23
Moisture Vent Right Side 24
Moisture Vent Left Side 25
Cabinet Left Side 26
Baking Chamber Left Side 28
Insulation in Wall 30
Cabinet Right Side 32
Baking Chamber Right Side 34
Insulation in Wall 36
Baking Compartments 38
lighting glass (7) 41
Thermostats (8) 39
Cabinet Back 40
Baking Chamber Back 42
Insulation 44
Vertical Support Member 46
Vertical Support Member 48
Cabinet Bottom 50
Baking Chamber Bottom 52

Deck Oven Front 54
Access Opening 56
Door 58
Gasket 59
Hinges 60
Guide Opening 62
Open Sided Baking Compartment 64
Open Sided Baking Compartment 66
Open Sided Baking Compartment 68
Open Sided Baking Compartment 70
Open Sided Baking Compartment 72
Open Sided Baking Compartment 74
Open Sided Baking Compartment 76
Top Deck 80
Intermediate Deck 82
Intermediate Deck 84
Intermediate Deck 86
Intermediate Deck 88
Intermediate Deck 90
Intermediate Deck 92
Bottom Deck 94

A PARTICULAR DECK

Intermediate Deck 82
Slots 142 and 142
Top Plate 96
Top Plate Flange 104
Top Plate Flare at Rear of Plate 106
Cantilever arm left 98
Cantilever arm right 100
Cantilever arm cross member 102
Top Plate Retaining Screw 108
Heat Sensor 112
Heat Sensor Tip 114
Heat Sensor Radiant Energy Shield 116
Shield Retaining Rivets 118 and 120
Bottom Plate 122
Upper Side Bottom Plate 124
Vent 126
Heat absorptive coating 128
Heating Element 130
Break of Bottom Plate 132
Space Between Plates 134
Side of Deck 136
Side of Deck 138
Side of Baking Compartment 139
Side of Baking Compartment 140
Spacing between Side of Deck and Sidewall 142
Spacing Between Side of Deck and Sidewall 142'
Rolling Baking Rack 144
Wheels 146, 148, 150, and 152
Axles 154, 156, 158, and 160
Pivot Mount 162, 164, 166, and 168
Spacing Between Wheels—Width 170
Spacing Between Wheels depth 172
Height of Rack 174
Width of Rack 176
Depth of Rack 178
Shelves on Rack (7) 180, 182, 184, 186, 188, 190, 192
Pitch of Shelves on rack 194
Pitch of Deck 196
Handle 198
Baking Pans 200
Product 202
Proofer 204
Proofing Compartment 206

ELECTRICAL

Heat Sensor Leads (8)
Baking Chamber Lights (7)
Baking Chamber Power Source (8)
Heating Elements (8)

Referring to the drawings, FIG. 1 shows in perspective, a rack loaded, radiant heated, cantilevered deck, baking oven, 12, with door removed.

The oven comprises an insulated cabinet 14, enclosing an internal baking chamber 16. Cabinet top 18, and baking chamber top 20, are separated by a layer of insulation 22.

Cabinet side 26, and baking chamber side 28, are separated by a layer of insulation 30. Cabinet right side 32, and baking chamber right side 34, are separated by insulation layer 36.

Between left side 26, and right side 34, are mounted seven parallel open sided baking compartments 38.

Back 40, and baking compartment back 42, are separated by insulation layer 44. Cabinet bottom 50, and baking compartment bottom 52, have no insulation between them. Bottom 50, and bottom 52, are simply the two sides of a single piece of metal. Insulation is not placed in the cabinet bottom. The temperature below chamber 16, i.e. below the lowest cooking deck, is cooler than is chamber 16.

The front 54, of the baking cabinet 14, has an access opening 56, gasketed by gasket 59, and closed by insulated glass paneled door 58. Door 58 is supported by hinges 60.

Attached through the back of the cabinet 40 are structural members 46 and 48.

The back of cabinet 40, and the back of the baking chamber 42, have holes formed therethrough to allow electrical connection to the heating elements.

The left cabinet side 26, and the left side of the baking chamber 28, are pierced by moisture vent 25. Vent 25 allows outside air to enter the bottom of the oven. The right side of the cabinet 32 and the baking chamber right side 34 are pierced for vent 24. At the top of the oven, between cabinet top 18, above the baking chamber, an adjustable vent 23 is mounted. This adjustable vent is used to adjust air flow through the oven, 12. Air flow removes moisture that passes into the oven as the bread is baked. In discrete deck, radiant heated ovens, this moisture is vented during the regular insertion and removal of baking pans. In a rack loaded, radiant baking oven, the moisture must be vented with the least disturbance to thermal gradients between decks.

On the right side of the oven, lights are mounted. The baking chamber right side 34 is cut for seven circular windows. The outside of the cabinet 32 is also cut for seven circular windows. Between the inside and outside windows are mounted light bulbs. The light from the bulbs, lights the cooking decks so that baking can be observed.

Mounting of the lighting is best seen in FIG. 1. Eight Thermostats, 39, are mounted on the front right side of the oven. Each thermostat controls the temperature of a single deck.

Baking chamber 16, in the oven shown, comprises seven open sided baking compartments 38, individually numbered here as 64, 66, 68, 70, 72, 74 and 76. The baking chambers are disposed vertically over each other and are separated by intermediate decks 82, 84, 86, 88, 90 and 92. There is also a bottom deck 94.

Figures 3, 4:
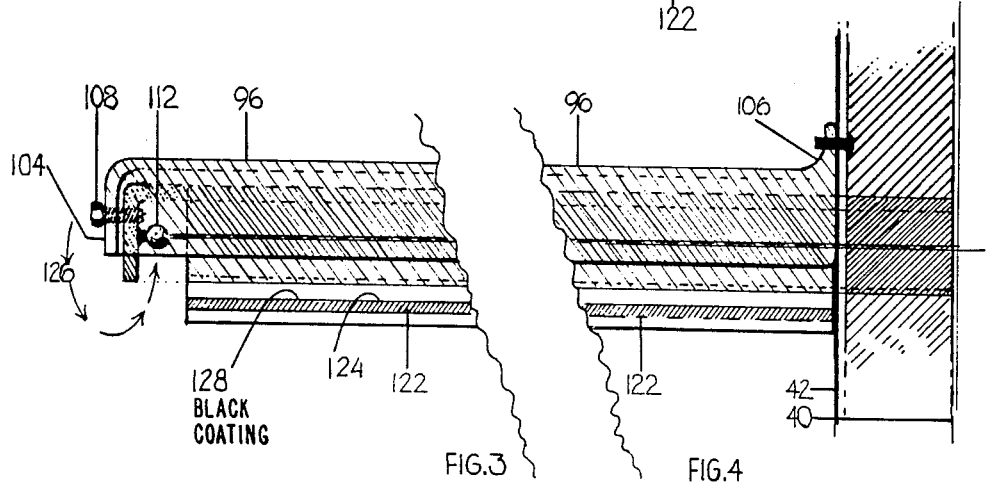

Each intermediate deck as for example, deck 82 as best shown in FIG. 2 and in FIG. 3, comprises a top plate 96 supported by cantilever arm 98 and 100 and cantilever arm cross member 102 attached to and passing through the back of the cabinet 42; arms 98 and 100 are welded to vertical supports 46 and 48; slots 95 and 95' form access opening 56 from the front of the oven to the back of the oven 42, along the sides of the plates.

Top plate 96 has a depending flange 104 extending around the perimeter of the deck; bottom plate 122, of deck 82, is spaced apart from the top plate 96. Top plate 96 extends substantially across the width and depth of the baking compartment, except for the slots between the sides of the deck and the sides of the baking compartment; 142 and 142' extend from the front of the oven to the back of the oven.

The depending flange 104 of top plate 96 extends laterally across the oven.

The bottom plate 122 extends substantially across the width of the baking compartment, except for the slots 142 and 142'. The bottom plate extends forwardly a predetermined distance short of flange 104 of the top plate 96, to provide a vent 126 of predetermined width extending across the width of the deck 82.

Bottom plate 122 being shorter than the top plate 96, leaves a passage or vent 126 into the interior space between top plate 96 and bottom plate 122 as best shown in FIG. 3.

Figure 6:
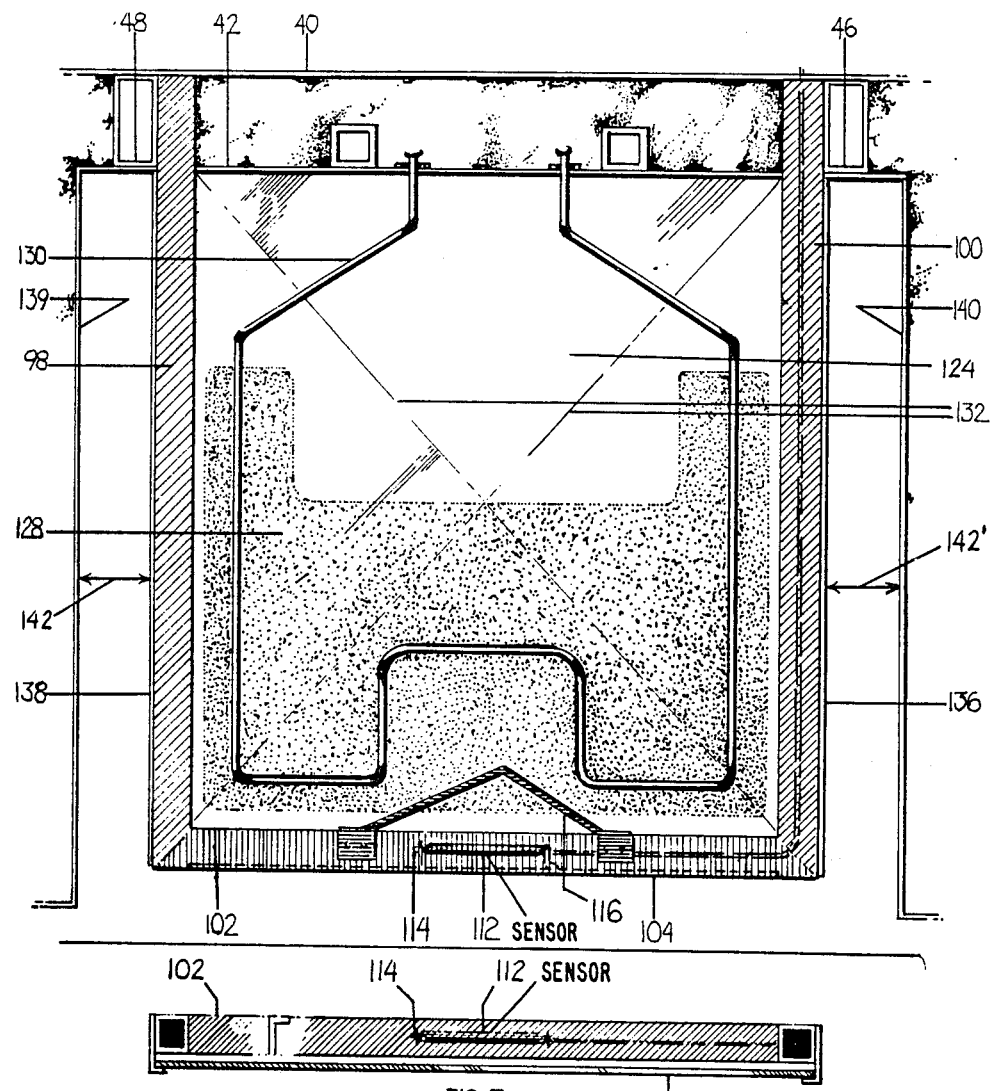
Figure 5:
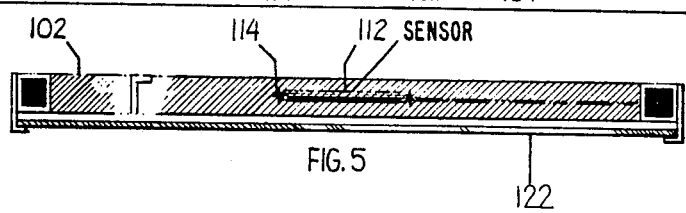

As best shown in FIG. 6, bottom plate 122 has its upper side 124 blackened by a heat absorptive coating 128 in a pattern preferably in the form of a rectangle with extended legs, shown in stippling in FIG. 6. The coating is located a predetermined distance from the front and rear of bottom plate 122.

Between top plate 96 and bottom plate 122 is electrical heating element 130 as shown in FIG. 6; element 130 extends substantially across the surface of the bottom plate 122, above the blackened coating 128 and rearwardly beyond the plane section thereof. Heating element 130 is located substantially midway of top plate 96 and bottom plate 122. Element 130 is electrically connected to a plug built into the back 40 of the oven cabinet.

Within space 134, between plates 96 and 122 is mounted a fluid filled heating sensing bulb 112. Alternately a thermocouple can be used. As shown in FIG. 3, sensor 112, is located so tha tip 114, thereof is located substantially within vent 126 and in close proximity to vent 126 as shown in FIG. 3, and is supported by a bracket attached thereto as best shown in FIG. 6. Sensor 112 is connected to thermostat 39 in the usual manner.

Intermediate deck 84 is identical to intermediate deck 82 described above, and is controlled by thermostat 39 shown in FIG. 3. Upper baking compartment 64 top deck 80 is identical to deck 82 described above, except that the cabinet ceiling is used as the upper plate of the deck. Preferably the cabinet ceiling is provided with a depending flange (not shown) which cooperates with the lower plate to provide a vent to the heat sensor. Bottom deck 94 of baking chamber 76 the lowest baking compartment is similar to deck 82 but differs in that the bottom deck of the lowest baking compartment is not blackened and is insulated to limit heat transfer to the area below deck 94. In bottom deck 94 the flange on the upper plate cooperates with bottom wall of the oven chamber to provide a suitable vent. Bottom deck 94 is controlled by its own thermostat as are the other decks.

Figure 10:
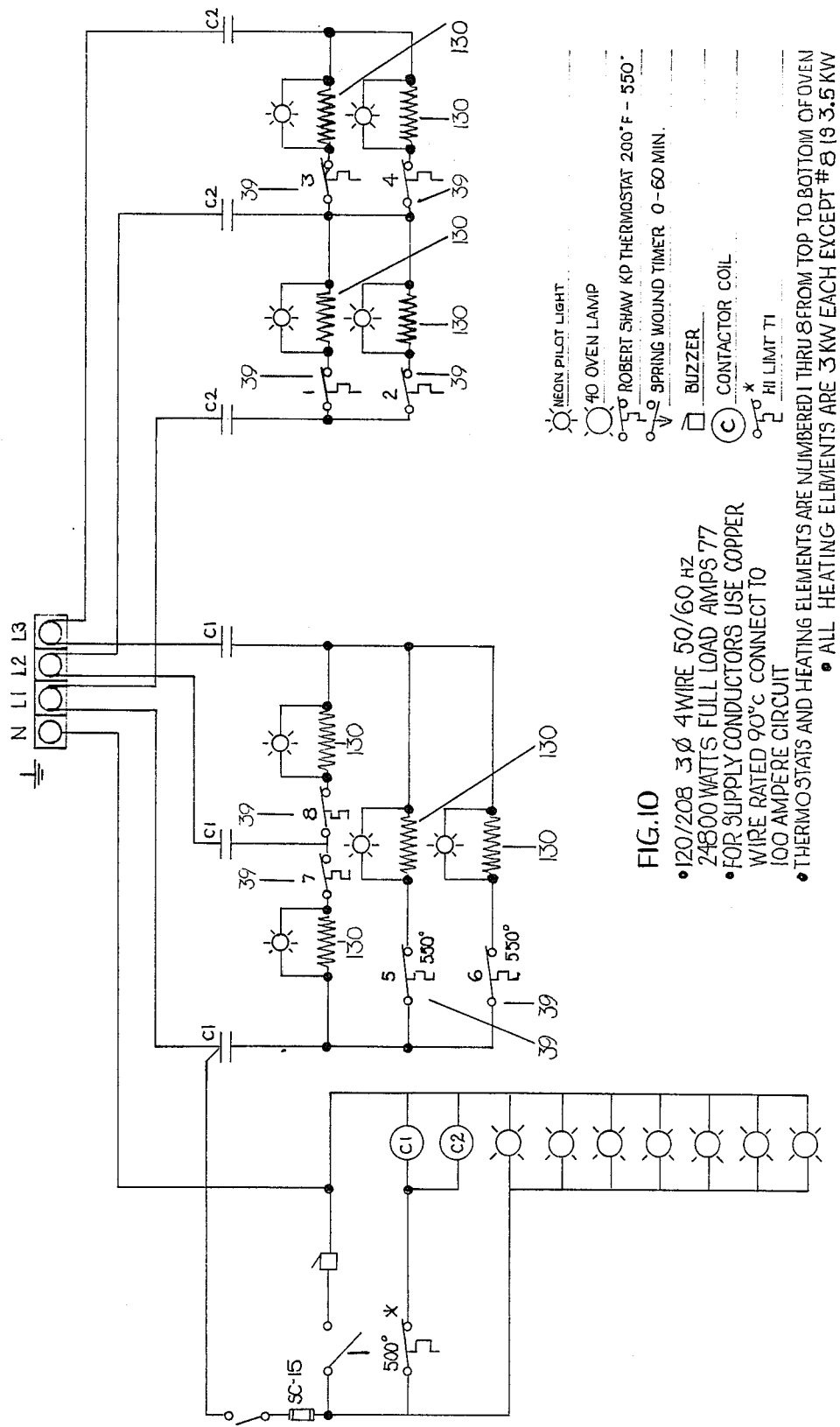

FIG. 10 shows an electrical wiring diagram, a ladder diagram, of the oven. N is neutral with lines 1, 2 and 3 marked L1, L2 and L3 respectively.

The Neutral line is connected to a buzzer, to the contractor coils and to the light bulbs that light the inside of the oven.

Running off line 1, is contactor, single pole switch, fuse to timer, fuse to high limit thermostat and to the other side of the light bulbs.

The high limit thermostat turns the oven off if the oven gets too hot. In this example, the high limit thermostat turns the oven off at 550 DEG F.

When power is on, the switch and the timer must be closed, to complete the circuit and power the oven.

As can be seen from the diagram, fluid operated thermostats operate to stop power supply to each heating element if the element reaches 550 DEG Fahrenheit. A pilot light is wired across each element and when the element is on, that pilot light is lit.

Each deck is controlled by a thermostat connected in series with the heating element, across 208 volt or 240 volt leads. A pilot light, as stated, is connected across the heating element to indicate if the heating coil is energized.

A 15 amp single toggle switch is provided across line 1 for energizing or de-energizing the oven.

ROLL-IN-RACK

Figure 7:
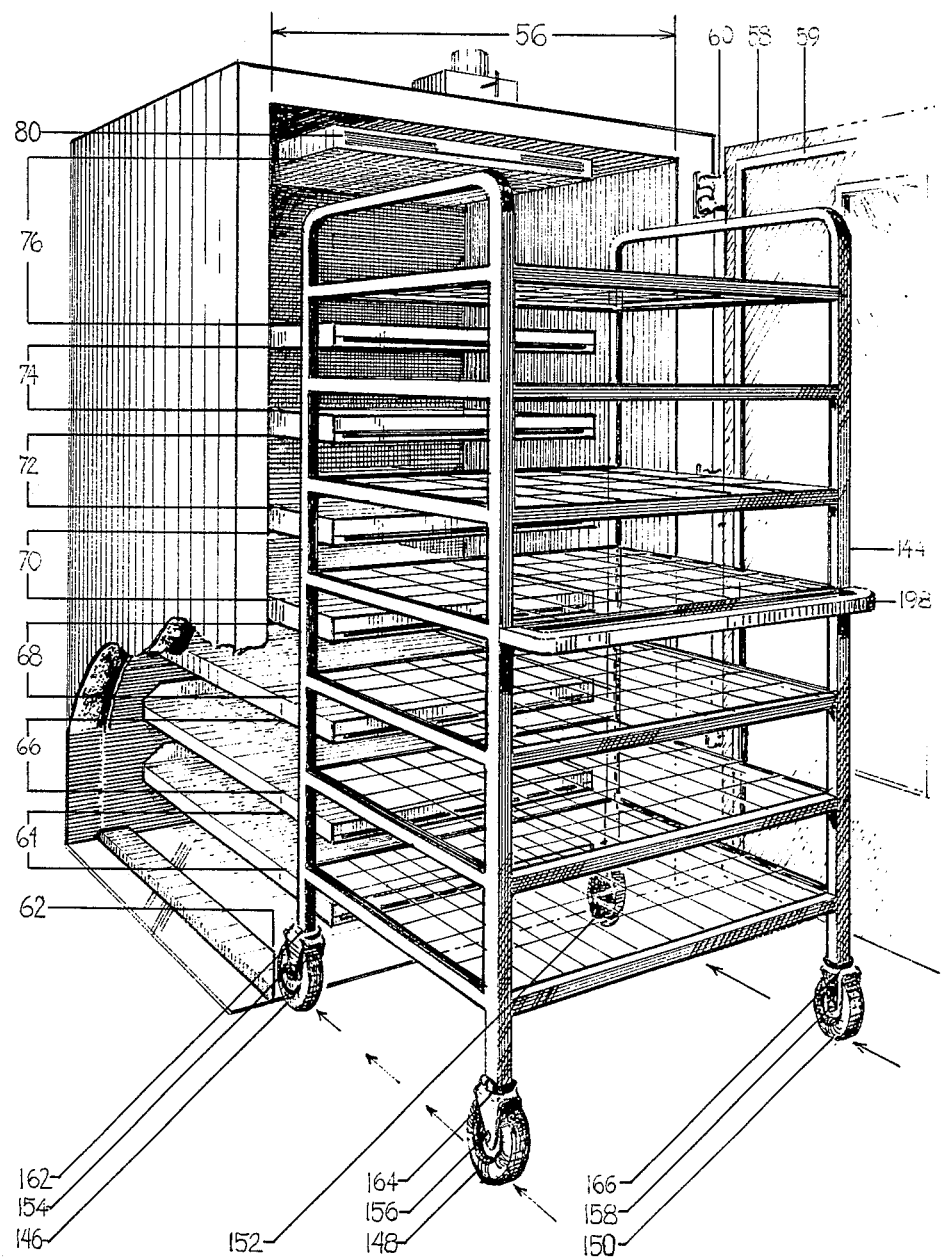

FIG. 7 shows the insertion of a baking rack 144 into the cantilevered deck oven 12.

Rack 144 is slightly shorter than the height of the baking chamber 16, measured between the baking chamber top 20 and the baking chamber bottom 52.

Figure 9:
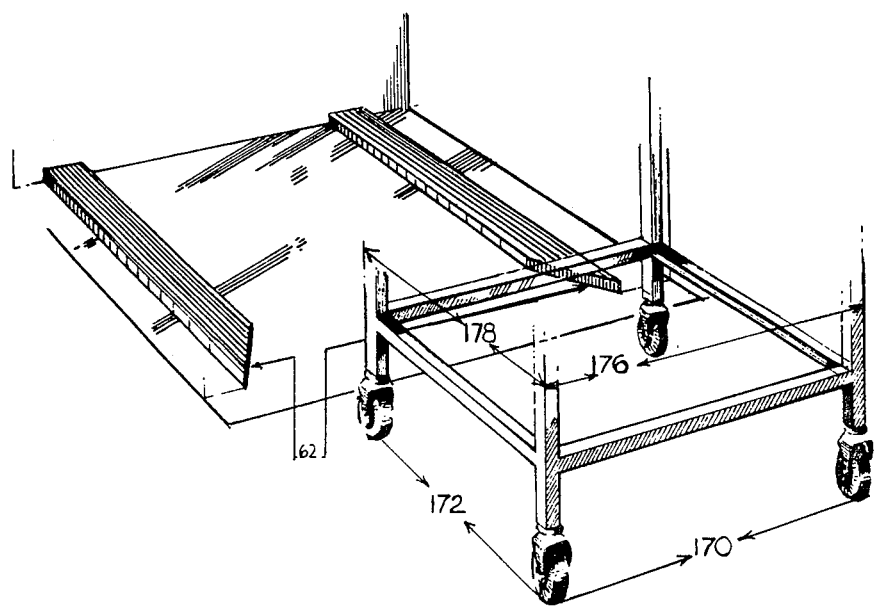

At the bottom of the chamber 52, guide openings 62 serve to guide rack 144 into the baking compartment as best shown in FIG. 9.

The width of the rack 144 is such as to allow the rack 144 to enter the baking compartment.

The depth of the rack 144 is such as to allow the door 58 to close once the rack is inserted.

The spacing between the sides of the decks and the sidewalls of the baking compartment which allows the rack 144 to be inserted is shown in FIG. 6 and FIG. 7 as 142 and 142'.

DESCRIPTION OF OPERATION

Referring again to FIG. 1, intermediate deck 82 is heats the lower half of the upper compartment and the upper half of the lower baking compartment. The bottom deck 94 heats the lower half of the baking compartment above it and the top deck above heats the upper half of the baking compartment below it.

Seven sets of centilever arms support the decks. Cantilever mounting of the decks from the back allows a rack to be used to load the baking oven.

The cantilever arms are mounted with a slight pitch, with the end of the arm closest to the door, slightly lower than the end of the arm at the back of the chamber.

Fourteen support arms are mounted in two vertical rows to support the seven decks.

One inch by inch square tubing of 14 gauge thickness, forty one and one half inches long are used to make the support arms. The capillary tube from the sensor to the thermostat passes through the hollow center section of the tubing.

Top plate 84 and bottom plate 103 are affixed to the support arms with heating element 108 sandwiched between. The heating elements are 3000 watt elements, except for the bottom element which is a 3500 watt element.

Top plate 84 is formed of a bright polished high temperature aluminum sheet 0.190 inch in thickness having the commercial designation 3003 H 14 Aluminum. The top plate can also be coated with a non-stick coating such as a suitable high temperature solid fluorinated hydrocarbon. The bottom plate, 103, is formed of a 0.125 inch, high temperature aluminum sheet having the commercial designation 3003 H14 Aluminium. Top and bottom plate are preferably spaced about two inches apart. The bottom of the top deck is formed of the same is 0.125 inch, high temperature aluminum sheet; the bottom of the bottom baking compartment is 14 gauge aluminized steel, with 0.063 Aluminum sheet 3003 H 14 Aluminum used as a reflector plate. The aluminized steel is used as an insulator below the aluminum sheet which is a reflector. This is to keep the bottom of the oven below the baking chamber, in the area where the rack wheels are located, cooler.

The bottom plate 122, on all decks except for the lowest deck bottom plate, is coated with a heat absorptive coating 128 to enable it to transmit heat from the heating element 130 between the plates at a higher rate than is transmitted through the top plate, so that the bottom plate 122 on each deck, except the bottom deck, is heated to a temperature of about 100 degrees Fahrenheit higher than the top plate so that bread can browned. The paint pattern allows varying the temperature in the browning gradient.

In the preferred embodiment, the pattern is in the form of a rectangle 27 inches by 22½ inches with extended legs.

A rectangular section, 10 inches by 16 inches, is left bare at the back of the deck. The paint pattern stops 7 inches back from the back of the oven.

The object of the pattern is to establish a uniform thermal gradient. The back of the baking chamber loses less heat because of insulation and less air flow.

The browning gradient can be varied in temperature by varying the thickness of the lower plate and by varying the pattern of the heat absorption layer.

The inside of the baking compartment is formed of 18 gauge aluminized steel as an oven liner. Between the liner and the external sides of the baking oven are 2 and ½ inches of fibreglass insulation. Six inches of insulation are in the top of the device.

The decks are 26 inches wide with a depth of 36 inches. A standard baking pan is 18 inches wide by 26 inches deep. This deck width and the individual heating elements, allow the oven to be used as a discrete deck oven by heating only two decks and baking in the thermal gradient established in the open sided baking compartment between the two heated decks.

Figure 8:
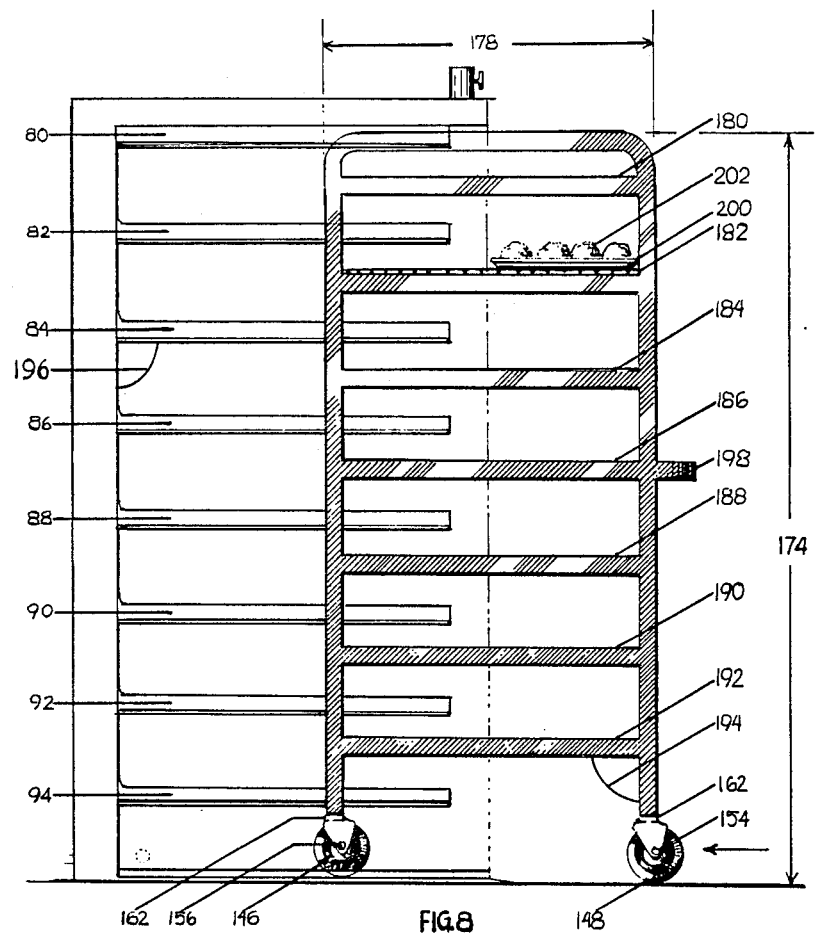

The rack to be inserted in the oven as shown in FIGS. 7, 8 and 9 uses 5 inch high temperature plastic wheels. The rack itself is aluminum and is dimensioned to accept two baking trays per level.

Pitch of the rack is ⅜ of an inch over 37 inches. The rack width is 30 inches outside and 27 and ½ inches internal with a depth of 36 inches.

An object of the dimensioning and pitch of the deck and the pitch of the rack is to attempt to attain a uniform one-half inch clearance between the bottom of the pan holding the bread and the surface of the deck.

A cantilevered deck, radiant baking oven must maintain stable thermal gradients in baking compartments open on three sides and must allow removal of moisture given off by bread being baked. If the moisture is not removed, the bread doesn't bake or brown. If the moisture is not removed without creating excessive convection currents the goods are not baked uniformly.

The baking chamber is vented in both lower corners and at the top. Venting is not necessary in discrete deck ovens because the continuing opening and closing of the doors to each deck, as pans are inserted and removed, removes moisture.

In this rack loaded device, for example, a rack loaded with 84 pounds of bread containing 2 ounces per pound of moisture to be baked off, 168 ounces of moisture must be vented through one baking cycle. The moisture must be vented without creating internal air currents that would disturb the desired thermal gradients.

Vents at the bottom of the oven, one inch in diameter, fitted with adjustable dampers allow air to infiltrate into the bottom of the oven, be preheated, and then pass along the sides of the chamber. A vent 2.25 inch diameter at the top of the oven with an adjustable damper, allows air to exhaust. Air circulation through these vents serves to carry off the moisture generated during the baking cycle.

To calibrate the oven to establish the desired thermal gradients in the baking components, a temperature of 375 DEG F at a point midway between the decks as for example of the baking space between decks 82 and 84 is assumed. All of the heating elements in the decks are energized and heated to the same temperature to establish the baking temperature midway of the baking compartment at 375 DEG, as determined by a pyrometer. In the instant example this results in a top plate temperature of 400 DEG F as determined by a contact pyrometer. By reason of the construction of the deck, the bottom plate is heated to a temperature of 500 DEG. The thermostat is then set to read 375 DEG F. Other baking compartment temperatures are then selected to calibrate the thermostat. The other thermostats are calibrated in a similar manner. Each thermostat dial is used to establish the baking temperature midway of the decks. Preferably the thermostats are adjusted to cycle or de-energize the heating elements at a bottom plate temperature of 500 DEG. If the entire surface of the bottom plate is blackened, the top areas of the bread loaves will burn or blacken. It has also been found that uniform baking and browning of the bread loaves is accomplished by blackening the bottom plate in the rectangular pattern described above. The dimensions of this blackened surface is determined experimentally and empirically. A suitable coating material is the commercial coating known as Bar-B-Que Black sold by Rust-Oleum Corporation. It has also been found that the top plate provides uniform heating of the lower portion of the upper baking compartment without any surface modification of portions thereof. As shown in FIG. 6, the heating element is located forwardly of the rear of the oven compartment to improve uniform heating since the rear portions of the baking compartments are better insulated than the forward portions due to the relatively poor insulating capabilities of the glass paneled door, if one is used, the heat loss due to opening and closing of the door and heat loss from air used to carry away the moisture generated by baking.

The establishment of the top and bottom plate temperatures as above indicated results in a desired temperature of about 375 DEG F vertically midway of the baking compartment with the upper portion of each baking compartment having a temperature gradient ranging from about 375 DEG to 500 DEG in an upward direction to provide a suitable browning temperature and with the lower half having a temperature gradient ranging from about 400 DEG F at the bottom thereof to about 375 DEG F midway of the compartment to provide a suitable baking temperature.

A feature of the invention is the location of the tip is the temperature sensing bulb within or in close proximity as for example within one-fourth inch of the vent portion between the upper and lower plates and in the vent air flow path. When the oven door is opened or the intake and exhaust vents are opened cool air is immediately drawn into the vent into the enclosed space between the decks and impinges on the bulb tip causing heating element 108 to be energized and compensate for heat loss due to air infiltration and opening of the door. The sensing tip is spaced from the wall as shown in FIG. 3 so that it senses the air temperature rather than wall temperature and is located close to the top plate so that it is not overheated. Preferably the thickness or transverse dimension of the vent into the enclosed space is about one inch. The width of the vent into the enclosed space is determined empirically so as to permit the bulb tip to sense both the deck temperature and the air flow from through the vent when the door is opened and as air is allowed into the oven to carry off moisture. If the vent is too narrow the bulb tip will sense predominately the deck temperature and if too wide it will sense predominately the ambient air and in either case the thermostat control will not provide the desired temperature gradients. The location of the temperature sensing bulb within the deck and behind a protective shielf protects it from physical damage or mislocation in the use of the oven. While the use of a fluid filled bulb is preferred as the sensing means, other devices such as a thermocouple may be used. A protective shield is placed between the sensor and the heating element to prevent radiant heat from causing the element to cycle.

While this invention is primarily concerned with multiple baking compartment baking ovens, it is also applicable to discrete deck ovens using a single baking compartment or chamber. In such embodiment, only two decks are heated, one above the other, the top deck provides the upper portion of the baking chamber with a browning temperature gradient and the bottom deck provides the lower portion of the baking temperature gradient.

We claim:

1. A baking oven comprising:
   a. a baking chamber encased in a cabinet including top, bottom, side walls, and a back wall, and a front wall having a front access opening and a door for closing said access opening;
   b. a top deck defining an upper side of said chamber and a bottom deck defining a bottom side thereof;
   c. each of such decks comprising upper and lower horizontally disposed plates in spaced relation, forming an enclosed space therebetween; each of such decks having means adjacent to outside edges of such plates, forming a side wall vent to allow heated moist air to rise to the top of the chamber along the side walls of the chamber; the depth of such deck measured on a line normal to the back wall of the chamber, being shorter than the depth of the chamber measured from the back wall to the closed door, to allow a rack to be inserted in the chamber and the door closed;
   deck support means, comprising cantilever arms passing through the back wall of the chamber, supporting such decks;
   d. an electrical heating element located between said plates of each said decks and extending across the plates so as to provide substantially uniform heating thereacross;
   e. a temperature sensing means mounted within each deck and a thermostat including a switch associated with each of said decks operatively connected to the sensing means and to said heating element;
   f. said sensing means being operative to actuate said thermostat switch to maintain baking temperature in the baking chamber;
   a first vent for allowing outside air to enter the baking chamber, such vent located below the bottom deck;
   a second vent for allowing hot moist air to escape from the baking chamber, such vent located above the top deck;
   means for adjusting the size of the vents to vary air flow through the baking chamber.

2. A baking oven comprising:
   a. a baking chamber encased in a cabinet including top, botton, side walls, back wall and a front wall having a front access opening and a door for closing said access opening;
   b. a top deck defining the top of said chamber and a bottom deck defining the bottom thereof;
   c. each of said decks comprising upper and lower horizontally disposed plates in spaced relation, forming an enclosed space therebetween and each deck having depth and width and a relatively narrow vent across the width of the deck providing controlled air flow access to said enclosed space within the deck;
   d. an electrical heating element located within each of said decks and extending across the deck to provide substantially uniform heating thereacross;
   e. a temperature sensing means located within each deck near to a wall thereof, with its sensing tip being located substantially at said narrow vent and a thermostat including a switch associated with ech of said decks operatively connected to said sensing means and to said heating element;
   f. the bottom plate of said top deck being partially blackened on its upper surface;
   g. the heating element of said top deck being operative to uniformly heat the upper portion of said baking chamber through said blackened plate to a browning temperature gradient;
   h. the heating element of said bottom deck being operative to heat the lower portion of said baking chamber to a lesser predetermined baking temperature gradient;
   i. said sensing tips of said top and bottom deck sensing means being operative to sense both the deck temperature in which it is contained and the ambient air temperature entering said decks through said vents and said sensing means of each of said decks being operative to actuate said thermostat switch means associated therewith to cooler air entering said vents to maintain said temperature gradients when air passes through the baking chamber;
   the width of each baking deck measured along a line normal to the side walls of the baking chamber being less than the width of the baking chamber, thereby providing a passage along the side of the chamber allowing hot moist air to rise up along the chamber sides and allowing the insertion of a rack;

the depth of the baking deck being less than the depth of the baking chamber pass through the chamber and exit the chamber thereby allowing a rack to be inserted into the baking oven;

vent means operative to allow outside air to enter the baking chamber comprising a first adjustable vent located at the bottom of the baking oven, below the baking chamber, and a second adjustable vent located in the top of the baking oven above the baking chamber.

3. A baking oven comprising:

a. a baking chamber encased in a cabinet including top, bottom, side walls and back wall and a front wall having an access opening;

b. A top deck defining the top of said chamber, a bottom deck defining the bottom thereof and at least one intermediate deck dividing said chamber into at least two baking compartments;

c. each of said decks comprising upper and lower horizontally disposed plates in spaced relation forming an enclosed space therebetween;

the depth of said decks being less than the depth of the chamber, the width of said decks being less than the width of the chamber, so as to allow a rack to be inserted in the chamber and the door closed;

cantilever mounts supporting such decks from the back of the cabinet;

d. an electrical heating element located between the plates of each deck and extending substantially across the deck so as to provide substantially uniform heating of said deck;

e. a temperature sensing means located within each deck and a thermostat including a switch associated with each of said decks operatively connected to said sensing means of each of said decks and to the heating element thereof;

f. said temperature sensing means being operative to sense baking temperature and said sensing means operative to actuate said thermostat switch means to maintain baking temperature;

a lower temperature chamber located between the bottom deck and the bottom of the cabinet;

an air intake vent located in the lower temperature chamber operative to allow dry outside air to enter the lower temperature chamber, be preheated, and then enter the baking chamber;

guide means located in the lower temperature chamber, operative to guide the wheels of an inserted bakery rack;

air exhaust means operative to allow heated moist air to exit the chamber above the top deck.

4. A baking oven comprising:

a. a baking chamber encased in a cabinet including top, bottom, side walls, and back wall and a front wall having an access opening and a door for closing said access opening;

b. a top deck defining the top of said chamber, a bottom deck defining the bottom thereof and at least one intermediate deck dividing said chamber into at least two baking compartments;

c. each of said decks comprising upper and lower horizontally disposed plates in spaced relation forming an enclosed space therebetween;

d. each of said decks being separated from and standing away from the side walls and the front wall of the cabinet; whereby moisture given off from goods baked can migrate from the decks to the sidewalls and then to the top of the chamber;

e. each of said decks being less deep than the depth of the baking chamber so that a rack may be inserted between the door and the side of the deck adjacent said access opening;

f. a first adjustable air vent located above the top deck;

g. a second adjustable air vent located below the bottom deck;

h. an electrical heating element located between said plates of each of said decks and extending substantially across the the deck so as to provide substantially uniform heating of said deck;

i. a temperature sensing means located in said enclosed space in each deck near to a wall of said chamber with its sensing tip located substantially at said vent and a thermostat including a switch associated with each of said decks operatively connected to said sensing means of each of said decks and to the heating element thereof;

j. the bottom plate of said top and intermediate decks being partially blackened on its upper surface;

k. the heating element of said top deck being operative to uniformly heat an uppermost baking compartment through said blackened plate to a browning temperature gradient;

l. the heating element of said intermediate deck being operative to heat a lower portion of an upper compartment to a lower baking temperature gradient and to heat the upper portion of a lower compartment to a browning temperature gradient;

m. the heating element of said bottom deck being operative to heat the lower compartment to baking temperature gradient;

n. a low temperature chamber below the bottom deck;

o. rack guide means located in the low temperature chamber operable to guide the wheels of a rack into such chamber;

p. said temperature sensing tip of said decks being operative to sense both deck temperature and ambient air temperature entering said decks through said vents and said sensing means being operative to actuate said thermostat switch means to maintain said temperature gradients and being promptly responsive to the cooler air entering said vents to maintain said temperature gradients when air passes through.

5. A baking oven comprising:

a. a baking chamber encased in a cabinet including top, bottom, side walls back wall and a front wall having a front access opening and a door for closing said access opening;

b. a top deck defining the top of said chamber, a bottom deck defining the bottom thereof and at least one intermediate deck deviding said chamber into at least two baking compartments;

c. each of said decks being supported by support means passing through the back wall of the baking chamber; each of said decks being displaced from and separated from the side walls and front wall of the baking chamber, to allow a rack to be inserted in the chamber;

d. each of said intermediate decks comprising upper and lower plates in spaced relation forming a space therebetween, with the upper plate extending near to said access opening and having a vertically extending flange at its front edge at said access opening and with said bottom plate extending to a point short of said access opening, cooperating to form a vertically disposed elongated vent to said space near to said access opening;

e. the said lower plate of said top and intermediate decks being partially blackened at its upper surface;

f. a first air vent located in the baking oven above the top deck;

g. a second air vent located in the baking oven, below the bottom deck;

h. a heating element located between said plates of said decks having a loop-like configuration extending substantially across said deck and rearwardly of said blackened portion in said top and intermediate decks;

i. a temperature sensing bulb disposed between the plates of each deck spaced from said chamber walls and in near proximity to the a plate of each deck with its sensing tip being located substantially at said vent and a separate thermostat means including a switch operatively connected to each of said bulbs and each of said heating elements;

j. the heating element of said top deck being operative to uniformly heat the upper portion of the uppermost baking compartment through said blackened plate thereof to a browning temperature gradient;

k. the heating element of said intermediate deck being operative to heat a lower portion of an upper compartment to a lower baking temperature gradient and to heat an upper portion of a lower compartment to a browning temperature gradient;

l. the heating element of said bottom deck being operative to heat a lower portion of a baking compartment to said lesser baking temperature gradient;

m. said sensing tips of said bulbs being operative to sense both deck temperature and ambient air temperature entering said decks through said vents and said thermostat means being operative to actuate said thermostat swithes to maintain said temperature gradients and being promptly responsive to cooler air entering said vents to maintain said temperature gradients as air passes through the oven;

6. A baking oven of the type in which a product is held in a pan, on a baking deck, in stable thermal gradient, in a baking chamber with a browning temperature gradient at a top of the gradient and a baking temperature at a bottom of the gradient, wherein the improvement comprises:

a. a heated top deck;

b. a heated bottom deck;

a lower temperature chamber located below the bottom deck;

c. at least one heated intermediate deck;

d. a front access opening spanning the said decks;

e. a single door for closing said access opening;

f. said decks being displaced from and separated from a side wall of the baking chamber and a front wall of the baking chamber, to allow a rack to be inserted through the access opening and into the chamber;

said decks being cantilever mounted through the back of the chamber;

g. a first air vent located in the lower temperature chamber below the bottom deck, operative to allow ambient air to enter, to lower the temperature in the chamber, and be preheated and rise in the chamber;

rack guide means located in the lower temperature chamber;

h. a second air vent located above the top deck operative to exhaust moisture laden air from the chamber as bread is baked.

* * * * *